United States Patent
Haam et al.

(10) Patent No.: US 8,671,769 B2
(45) Date of Patent: Mar. 18, 2014

(54) DEVICE FOR MEASURING DEFORMATION OF A STRUCTURE AND A METHOD FOR MEASURING DEFORMATION OF A STRUCTURE USING THE SAME

(75) Inventors: Seung Joo Haam, Seoul (KR); Yun Mook Lim, Seoul (KR); Yoon Cheol Lim, Seoul (KR); JoSeph Park, Seoul (KR)

(73) Assignees: Industry Academic Cooperation Foundation, Seoul (KR); Technovalue Co., Ltd., Seoul (KR)

( * ) Notice: Subject to any disclaimer, the term of this patent is extended or adjusted under 35 U.S.C. 154(b) by 229 days.

(21) Appl. No.: 13/203,217

(22) PCT Filed: Mar. 2, 2010

(86) PCT No.: PCT/KR2010/001299
§ 371 (c)(1),
(2), (4) Date: Aug. 24, 2011

(87) PCT Pub. No.: WO2010/098647
PCT Pub. Date: Sep. 2, 2010

(65) Prior Publication Data
US 2012/0152030 A1    Jun. 21, 2012

(30) Foreign Application Priority Data

Feb. 27, 2009 (KR) .......... 10-2009-0017315
Feb. 27, 2009 (KR) .......... 10-2009-0017316
Feb. 27, 2009 (KR) .......... 10-2009-0017317

(51) Int. Cl.
*G01B 11/16* (2006.01)

(52) U.S. Cl.
USPC .............. 73/762; 73/777

(58) Field of Classification Search
USPC ............ 73/760, 762, 777
See application file for complete search history.

(56) References Cited

U.S. PATENT DOCUMENTS

| 7,254,121 | B2 | 8/2007 | Kim et al. ........ 372/44.01 |
| 7,308,163 | B2* | 12/2007 | Bratkovski et al. ......... 385/12 |
| 7,430,039 | B2* | 9/2008 | Sugita ............ 356/39 |
| 7,546,013 | B1* | 6/2009 | Santori et al. ........ 385/39 |
| 7,771,045 | B2* | 8/2010 | Matera et al. ......... 351/49 |
| 7,792,406 | B2* | 9/2010 | Kambe et al. .......... 385/129 |
| 8,177,358 | B2* | 5/2012 | Matera et al. ......... 351/49 |
| 8,324,703 | B2* | 12/2012 | Parthangal et al. ......... 257/438 |
| 2007/0047898 | A1* | 3/2007 | Cheng ............ 385/147 |

FOREIGN PATENT DOCUMENTS

| KR | 10-2007-0088390 | 8/2007 |
| KR | 10-2008-0073591 | 8/2008 |
| KR | 10-2008-0104791 | 12/2008 |
| KR | 10-2009-0000859 | 1/2009 |
| WO | WO 91/09726 | 7/1991 |

* cited by examiner

*Primary Examiner* — Max Noori
(74) *Attorney, Agent, or Firm* — Swanson & Bratschun, L.L.C.

(57) ABSTRACT

The present invention is directed to a device for measuring a deformation ratio of a structure which includes a photonic crystal layer containing nanoparticles aligned at a certain interval. The device is useful for detecting when various industrial structures are deformed by a working load. The presence of deformation and the deformation ratio in the structures may be simply and easily measured by measuring the change of structural color or magnetic flux in the device. The device may be useful to prevent accidents due to excessive deformation in structures.

13 Claims, 9 Drawing Sheets

US 8,671,769 B2

DEVICE FOR MEASURING DEFORMATION OF A STRUCTURE AND A METHOD FOR MEASURING DEFORMATION OF A STRUCTURE USING THE SAME

TECHNICAL FIELD

The present invention relates to a device for measuring deformation of a structure and a method for measuring deformation of structures using the same.

BACKGROUND ART

Structures, which are variously used in architectural, civil engineering, and mechanical fields, are deformed by work load during common use. Such a deformation arises from a combination of various loads, wherein it is a very important basis in determining the state of a structure by measuring the degree of deformation by the existing load received by the structure.

Methods for measuring deformation of such a structure have been developed and researched, recently. However, various complicated electrical devices are conventionally introduced to measure the deformation of a structure, and thus, there were problems that the methods were complicated and inconvenient.

That is, the conventional methods for measuring deformation of structures primarily measured deformation of structures with foil type deformation measurements using change of electric resistance, wherein the electrical device used to measure the deformation was expensive, inconvenient and complicated to use. Therefore, there is a need for developing a method for measuring deformation of a structure which is capable of more simply and correctly measuring deformation ratio of a structure.

DISCLOSURES

Technical Problem

The present invention is designed to satisfy the aforementioned need for development, and intended to provide a device for measuring deformation of a structure, which is capable of more simply and correctly measuring deformation ratio of a structure and a method for measuring deformation of a structure using the same.

Technical Solution

The present invention provides as a means for solving the above problem a device for measuring a deformation ratio of a structure comprising a substrate and a photonic crystal layer formed on the substrate containing nanoparticles aligned at a certain interval.

Furthermore, the present invention provides as the other means for solving the above problem a method for measuring a deformation ratio of a structure comprising a first step of forming a photonic crystal layer on a substrate; a second step of attaching the substrate on which said photonic crystal layer is formed to a surface of a target structure for measuring deformation; and a third step of measuring change of structural color or magnetic flux in said photonic crystal layer.

Advantageous Effects

According to the present device for measuring deformation ratio of a structure and method for measuring deformation ratio of a structure using the same, firstly, there is an advantage that deformation of structures may be more easily and simply identified by applying a photonic crystal layer containing photonic crystals and/or a magnetic body on a surface of various industrial structures without complicated electric devices; and secondly, deformation of structures may be correctly measured by change of magnetic flux in the magnetic body to correctly figure out the deformation degree, which is a basis for repair, and to prevent accidents due to excessive deformation of structures.

BEST MODE

Figure 1:
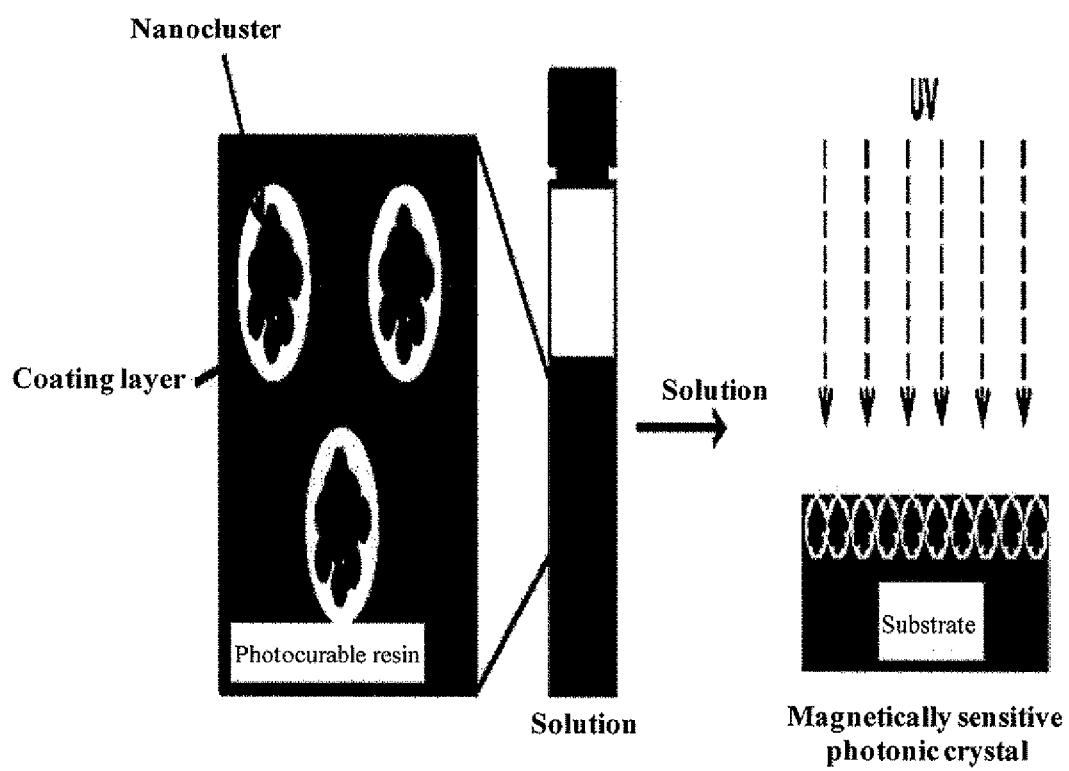
FIG. 1 represents a schematic view showing processes for manufacturing a device for measuring deformation ratio of a structure according to one aspect of the present invention.

The present invention relates to a device for measuring deformation ratio of a structure comprising a substrate and a photonic crystal layer formed on said substrate containing nanoparticles aligned at a certain interval.

The present device for measuring deformation ratio of a structure is explained in detail below.

Said substrate herein includes all the usual tapes which may be used in measuring deformation of a structure, and preferably, a stress-sensitive tape may be used without particular limitation.

That is, as described above, if the stress-sensitive tape as a substrate is used, the photonic crystal layer uniformly applies to one side thereof and the other side of the tape attaches to a surface of a structure. Therefore, when the structure is deformed, the tape is sensitively reacted and deformed together with the structure; change of intervals between nanoparticles included in said photonic crystal layer occurs; and thus structural color and magnetic flux in a portion of the deformed photonic crystal layer are changed, so that a degree of deformation in the structure may be correctly measured.

In said nanoparticles herein, a certain interval between particles in size is not particularly limited, as long as said nanoparticles represent photonic crystallinity, which may be preferably 1 nm to 10 nm. If said interval between said nanoparticles is less than 1 nm, there is a problem that a phenomenon where photonic crystals are broken occurs on deformation, since materials (for example, polyethyleneglycol diacrylate) acting as an adhesive do not enter into intervals between nanoparticles. If said interval is more than 10 nm, a problem may be caused where electrical signals cannot be observed, by departing from limits of a tunneling effect.

The term 'photonic crystal' used herein refers to a material having or prepared to have a structure which is capable of using optical characteristics of the material. That is, the photonic crystal is formed by aligning particles at a certain interval.

A diameter of said nanoparticles herein is not particularly limited, which may be appropriately selected depending on use, but preferably 50 nm to 300 nm. If the diameter of said nanoparticles herein is less than 50 nm, it departs from the visible light range and enters into the ultraviolet range, so that it can be difficult to observe the deformation degree by the human eye. If said diameter is more than 300 nm, it enters into the infrared range, so that it can be difficult to observe the change of light by the human eye.

Nanoparticles which may represent said photonic crystallinity herein are not particularly limited to any specific kind, and may be, for example, one or more selected from the group consisting of polystyrene, poly(meth)acrylic acid ester, poly(meth)acrylamide, polysiloxane, amphiphatic polystyrene/methacrylate block copolymer and a magnetic body.

In the present invention, said polystyrene may include polyalphamethylstyrene and the like; the specific kind of said poly(meth)acrylic acid ester be one or more selected from the group consisting of polyacrylate, polymethylmethacrylate, polybenzylmethacrylate, polyphenylmethacrylate, poly-1-metacyclohexylmethacrylate, polycyclohexylmethacrylate, polychlorobenzylmethacrylate, poly-1-phenylethylmethacrylate, poly-1,2-diphenylethylmethacrylate, polydiphenylmethylmethacrylate, polyfurfurylmethacrylate, poly-1-phenylcyclohexylmethacrylate, polypentachlorophenylmethacrylate and polypentabromophenylmethacrylate; said poly(meth)acrylamide include poly-N-isopropylacrylamide and the like; and said polysiloxane include polydimethylsiloxane and the like, without being limited thereto.

Polystyrene herein has a glass transition temperature, on which physical properties of a polymer are changed, of 95° C., and thus may be widely used without being affected by surrounding temperature change; and it has a degradation ability at no less than 320° C. to 330° C., and thus has an advantage of having excellent durability, so that it may be preferably used as nanoparticles included in a photonic crystal layer for measuring deformation of a structure.

Said polystyrene/methacrylate block copolymer herein is synthesized by reacting polystyrene with methylacrylate, has an excellent strength capable of providing greater durability, when it is attached to a surface of a structure in a state of being included in the photonic crystal layer, and may be subjected to hydrolysis to obtain amphiphatic polystyrene/methylacrylate block copolymer.

Said amphiphatic polystyrene/methylacrylate block copolymer herein may comprise 5 to 50 parts by weight of methylacrylate based on 100 parts by weight of polystyrene, and preferably 10 to 12 parts by weight of methylacrylate based on 100 parts by weight of polystyrene. If the amount of said methylacrylate is less than 5 parts by weight, repulsion on surfaces of the negatively charged particles is reduced, and thus the photonic crystal structure may be difficult to align. If the amount of said methylacrylate is more than 50 parts by weight, chains become longer, and thus a flocculation phenomenon may occur.

In addition, a weight average molecular weight of said polystyrene/methacrylate block copolymer herein is not particularly limited, but may be preferably 20,000 to 30,000. If said weight average molecular weight is less than 20,000, it is difficult to prepare nanoparticles having a diameter of 50 nm or more, and thus utility may be lowered. If said weight average molecular weight is more than 30,000, nanoparticles having a diameter of more than 300 nm may be prepared which are not suitable in terms of utility.

Meanwhile, said magnetic body herein, being a kind of nanoparticle included in the photonic crystal layer, may include all particles as long as they present magnetic properties, and be for example, one or more selected from the group consisting of metal materials, magnetic materials and magnetic alloys, but are not particularly limited thereto.

Said 'magnetic body' according to the present invention is a material by which magnetic flux flows, and such a flux more easily flows in a ferromagnetic body.

In the present invention, when a test voltage has been applied in a state of forming photonic crystals by said magnetic body, electrons are transferred through a wall of energy potential difference by tunneling effects thereof. Electrical signals may be obtained via this.

For defects, when electrons do not overcome an energy potential difference occur in a path (magnetic path) that said magnetic flux flows, insulation of electrical signals is generated, and when deformation occurs on surfaces of ferromagnetic photonic crystals aligned homogeneously at a certain interval, magnetic flux at a surface part is disconnected.

Therefore, a variation of magnetic flux may be identified by measuring magnetic flux which escapes into space of defective parts where said deformation occurs. That is, when interval change in a magnetic body aligned at a certain interval is caused by any deformation, the degree of deformation may be correctly measured by measuring a variation of magnetic flux in the corresponding parts.

Accordingly, when a photonic crystal layer comprising a magnetic body aligned at a certain interval is homogeneously attached to a surface of a structure, a deformation degree in the structure may be correctly measured using a simple magneto-detector and the like.

In the present invention, said metal materials are not particularly limited to any specific kind, and may include, for example, one or more selected from the group consisting of Pt, Pd, Ag, Cu and Au; said magnetic materials are also not particularly limited to any specific kind, and may include, for example, one or more selected from the group consisting of Co, Mn, Fe, Ni, Gd, Mo, $MM'_2O_4$ and $M_xO_y$ (said M and M' represent each independently Co, Fe, Ni, Zn, Gd or Cr, $0<x\leq 3$, $0<y\leq 5$); a specific example of said magnetic alloys may include one or more selected from the group consisting of CoCu, CoPt, FePt, CoSm, NiFe and NiFeCo, without being limited thereto.

Said magnetic body herein may be in a form comprising clusters of said ferromagnetic nanoparticles and a coating layer enclosing said clusters.

When said magnetic body consists of a composite in a form of a cluster, efficiency of magnetic properties is improved, so that it may be easier to measure a variation of magnetic flux; and when said hydrophilic coating layer is formed on ferromagnetic nanoparticles in such a cluster form, it is capable of being dispersed in water, so that it may be easier to align them at a certain interval.

Meanwhile, said ferromagnetic nanoparticles herein may comprise, especially, all materials having strong magnetic properties among magnetic bodies and be, for example, one or more selected from the group consisting of iron, manganese and cobalt, without being particularly limited thereto.

In the present invention, a method of preparing said ferromagnetic nanoparticles in a cluster form is not particularly limited, and for example, it may be prepared by the following method.

That is, said clusters of ferromagnetic nanoparticles may be prepared by a method comprising steps of (1) dissolving ferromagnetic nanoparticles in an organic solvent to prepare an oil phase; (2) dissolving an amphiphatic compound in an aqueous solvent to prepare an aqueous phase; (3) mixing said oil phase and aqueous phase to form an emulsion; and (4) separating the oil phase from said emulsion.

In the present invention, a method of preparing said ferromagnetic nanoparticles is also not particularly limited and, for example, they may be prepared by a method comprising steps of (a) reacting magnetic nanoparticle seeds, a nanoparticle precursor and an organic surface stabilizer in the presence of a solvent; and (b) pyrolyzing said reactant.

Said step (a) is a step of introducing the nanoparticle precursor into a solvent in which the organic surface stabilizer is included to coordinate the organic surface stabilizer to surfaces of nanoparticle.

In the present invention, the solvent which may be used in said step (a) is preferably a solvent having a high boiling point close to the pyrolysis temperature of a complex compound coordinated with the organic surface stabilizer to surfaces of nanoparticle precursors, an example of which may include one or more selected from the group consisting of an ether compound, a heterocyclic compound, an aromatic compound, a sulfoxide compound, an amide compound, an alcohol, a hydrocarbon with 1 to 20 carbon atoms and water.

As a specific kind of said solvent herein, an ether compound such as octyl ether, butyl ether, hexyl ether or decyl ether; a heterocyclic compound such as pyridine or tetrahydrofuran (THF); an aromatic compound such as toluene, xylene, mesitylene or benzene; a sulfoxide compound such as dimethylsulfoxide (DMSO); an amide compound such as dimethylformamide (DMF); an alcohol such as octyl alcohol or decanol; a hydrocarbon such as pentane, hexane, heptane, octane, decane, dodecane, tetradecane or hexadecane; or water may be used.

In the present invention, said magnetic nanoparticle seeds may include all materials having magnetic properties which may be used as nanoparticle seeds, and the specific kind is not particularly limited, and may be, for example, one or more selected from the group consisting of FePt, Co, Mn, Fe, Ni, Gd and Mo.

The nanoparticle precursor which may be used in the present invention is also not particularly limited to any specific kind, an example of which may include a metal compound that is formed by linking metal; and —CO, —NO, —$C_5H_5$, alkoxide or other known ligands, specifically a metal carbonyl compound such as iron pentacarbonyl $Fe(CO)_5$), ferrocene, or manganese carbonyl ($Mn_2(CO)_{10}$); or various organic metal compounds such as metal acetylacetonate compounds, for example, iron acetylacetonate($Fe(acac)_3$). Also, as said nanoparticle precursor, a metal salt comprising a metal ion that is formed by linking metal and known anions such as $Cl^-$ and $NO^{3-}$ are linked may be used, an example of which may include iron trichloride ($FeCl_3$), iron dichloride ($FeCl_2$) or iron nitrate ($Fe(NO_3)_3$), and the like.

In case of synthesizing alloy nanoparticles and composite nanoparticles, and the like, a mixture of said at least two metal nanoparticle precursors is used.

The organic surface stabilizer which may be used in step (a) of the present invention is not particularly limited to any specific kind, and may be, for example, one or more selected from the group consisting of alkyl trimethylammonium halide, saturated or unsaturated fatty acid, trialkylphosphine oxide, alkyl amine, alkyl thiol, sodium alkyl sulfate and sodium alkyl phosphate.

In the present invention, a reaction condition in said step (a) is not particularly limited, which may be appropriately controlled depending on kinds of nanoparticle precursors and surface stabilizers. For example, said reaction may be performed at room temperature or less, and it is preferred to be heated and maintain in a range of, usually, about 30° C. to 200° C.

In the present invention, said step (b) is a step of pyrolyzing a complex compound coordinated with an organic surface stabilizer to a surface of a nanoparticle precursor to grow nanoparticles. At this time, nanoparticles having a uniform size and shape may be formed depending on the reaction conditions, wherein said pyrolysis temperature may be appropriately controlled depending on kinds of nanoparticle precursors and surface stabilizers. Preferably, it is suitable to react them at about 50° C. to 500° C. The nanoparticles prepared in said step (b) may be separated or purified via known means.

In the present invention, ferromagnetic nanoparticles may be prepared via the aforementioned steps (a) and (b) and ferromagnetic nanoparticles in a cluster form may be prepared via a method of the aforementioned steps (1) to (4).

In the present invention, specific conditions in said method of preparing the cluster form using said ferromagnetic nanoparticles are not particularly limited. That is, the present ferromagnetic nanoparticle clusters may be prepared via a usual emulsion method in this field using an oil phase such as chloroform; an aqueous phase such as ultrapure water; and an amphiphatic compound such as polyvinyl alcohol. Also, said ferromagnetic nanoparticle clusters may be prepared in the presence of a suitable surfactant such as one or a mixture of at least two of a soap such as potassium oleate or sodium oleate; an anionic detergent such as aerosol OT, sodium cholate or sodium caprylate; a cationic detergent such as cetylpyridynium chloride, alkyltrimethylammonium bromide, benzalkonium chloride or cetyldimethylethylammonium bromide; a zwitterionic detergent such as N-alkyl-N,N-dimethylammonio-1-propanesulfate or CHAPS; a nonionic detergent such as polyoxyethylene ester, polyoxyethylenesorbitan ester, sorbitan esters or various tritons (ex. TX-100 or TX-114), Such a surfactant reduces interfacial tension between an aqueous phase and an oil phase, so that the oil phase or the aqueous phase dispersed in an emulsion may be present at a thermodynamically stable state.

A diameter of said ferromagnetic nanoparticle clusters herein is not particularly limited, which may be appropriately selected depending on use, and preferably be 40 nm to 250 nm.

As mentioned above, said magnetic body may be in a form comprising ferromagnetic nanoparticle clusters and a coating layer enclosing said clusters, and they may be easier aligned as a magnetic body by coating the ferromagnetic nanoparticle clusters with said hydrophilic coating layer.

In the present invention, said coating layer may include all materials which may have negative charges or positive charges and produce repulsion between particles. The specific kind of said coating layer is not particularly limited, and may be, for example, one or more selected from the group consisting of silica, polyalkylene glycol, polyether imide, polyvinyl pyrrolidone, hydrophilic polyamino acid and hydrophilic vinyl-based polymer resin.

In the present invention, a thickness of said photonic crystal layer is not particularly limited, which may be, preferably, 5 μm to 10 μm. If said thickness of photonic crystal layer is less than 5 μm an intensity to represent a characteristic of photonic crystal may not be observed. If said thickness of photonic crystal layer is more than 10 μm, it affects sensitivity and thus, the characteristic of the photonic crystal may be lost.

In the present invention, said photonic crystal layer may be in a form where nanoparticles are aligned at a certain interval in a thermosetting resin or a photocurable resin. That is, the photonic crystal layer may comprise a thermosetting resin or a photocurable resin; and nanoparticles which are aligned at a certain interval in the thermosetting resin or the photocurable resin.

In the present invention, said thermosetting resin or photocurable resin may be allowed to maintain a certain interval between nanoparticles by appropriately formulating it with nanoparticles, and to make photonic crystals.

The thermosetting resin which may be used herein is not particularly limited to any specific kind, and those generally accepted in this field may be used. In the present invention, a specific example may include an epoxy resin, a polyester resin, a phenol resin, a urea resin and a melamine resin, and the like.

The photocurable resin which may be used in the present invention is also not particularly limited to any specific kind, and be, for example, one or more selected from the group consisting of polyurethaneacrylate, polyisoprene acrylate or esterified compounds thereof, hydrogenated terpene resins, butadiene polymers, bisphenol diacrylate-based resins and polyethyleneglycol diacrylate.

The present invention also relates to a method of measuring a deformation ratio of a structure comprising a first step of forming a photonic crystal layer on a substrate; a second step of attaching the substrate on which said photonic crystal layer is formed to a surface of the target structure for measuring deformation; and a third step of measuring the change of structural color or magnetic flux in said photonic crystal layer.

In a method of measuring a deformation ratio of a structure according to one aspect of the present invention, firstly, a resin for forming a photonic crystal layer is applied on a surface of a substrate and irradiated with heat or light to form a photonic crystal layer on the surface of the substrate.

In the present invention, said substrate is not particularly limited to any specific kind, and may include all usual tapes which is capable of being used in deformation measurement of a structure and be various materials which may be used by attaching them to a structure. Preferably, a tape being stress-sensitive and having adherability may be used.

Therefore, in the first step of the measuring method according to the present invention, said photonic crystal layer may be formed on the substrate.

Subsequently, in the second step of the measuring method according to the present invention, said substrate on which the photonic crystal layer is formed may be attached to a surface of a target structure for measuring deformation. The term 'a target structure for measuring deformation' used herein is a target structure for measuring presence of deformation, which may be structures related to architecture and civil engineering, such as buildings and bridges, or mechanical structures, such as aircraft and ships, and the like.

When the substrate on which the photonic crystal layer is formed is attached to a surface of a structure as above, the presence and degree of deformation in said structure may be measured by measuring the structural color change and magnetic flux change depending on deformation of said structure in the third step according to the present invention.

In the present invention, a method of preparing said photonic crystal layer is not particularly limited, but it may be prepared, for example, by the following method.

The method of preparing the photonic crystal layer herein comprises steps of a) mixing ferromagnetic nanoparticle clusters and a precursor of a coating layer; b) forming a coating layer on the ferromagnetic nanoparticle clusters using said precursor of the coating layer; c) mixing said ferromagnetic nanoparticle clusters on which said coating layer is formed with a thermosetting resin or a photocurable resin; and d) applying heat or light to said mixture to prepare a photonic crystal layer.

In the present invention, said precursor of coating layer may include one or more selected from the group consisting of silica, polyalkylene glycol, polyether imide, polyvinyl pyrrolidone, hydrophilic polyamino acid and hydrophilic vinylic-based polymer resin.

According to one aspect of the present method of preparing the photonic crystal layer, it is explained in detail below to use silica as a precursor of the coating layer.

In said method of preparing the photonic crystal layer according to the present invention, the step a) is a step of mixing ferromagnetic nanoparticle clusters and the silica precursor, which induces hydrolysis and binding of said silica precursor with ferromagnetic nanoparticle clusters. The ferromagnetic nanoparticle clusters in said step a) act as a template for forming a hollow core part in the nanoparticles according to the present invention. By using such ferromagnetic nanoparticle clusters as a template herein, the method has advantages that, when compared to existing methods, allows for larger hollows to be formed inside the nanoparticles and the size of said hollows may be freely controlled.

In the present invention, said step a) consists of mixing said ferromagnetic nanoparticle clusters and a silica precursor in the presence of a solvent, a specific kind of which is not particularly limited, wherein various aqueous and organic solvents used commonly in this field, and preferably a mixed solvent of water and alcohol may be used.

Water in said mixed solvent herein acts on performing hydrolysis of the added silica precursor, wherein a hydroxyl group to be allowed to performing condensation and gelation in the step b) of the present invention is introduced into a silicon atom in the silica precursor in this step. Since the silica precursor is less soluble in water, it is used as a mixture with an appropriate organic solvent such as alcohol. Alcohol in the above may dissolve both water and the silica precursor, whereby it may homogeneously mix water and the silica precursor to perform hydrolysis. At this time, a ratio of mixing water and alcohol is not particularly limited, and one having ordinary skill in the art may easily select an appropriate mixing ratio.

In the present invention, as long as said silica precursor in the step a) may form a silica shell part on ferromagnetic nanoparticle clusters, it is not particularly limited, but it is preferred to use alkoxysilane such as tertramethoxy silane or tetraethoxy silane. More preferably, tetraethoxy silane of the foregoing is used.

In the step a) of the present invention, the desired thickness of the shell part may be controlled by regulating an amount of said alkoxy silane, which may be appropriately selected by one having ordinary skill in the art. A method of performing hydrolysis of the silica precursor in the step a) of the present invention is not particularly limited, which may be practiced by, for example, a general method of stirring under a reflux condition. In addition, an appropriate catalyst such as an acidic catalyst (for example, HCl, $CH_3COOH$, and the like) or a basic catalyst (for example, KOH, $NH_4OH$, and the like) may be added thereto to accelerate said hydrolysis.

In the present invention, said step b) is a step of performing a gelation reaction through condensation of said hydrolyzed silica precursor to form a silica shell part on the ferromagnetic nanoparticle clusters, wherein the hydrolyzed silica precursor is condensed and gelated by forming siloxane linkage (—Si—O—Si—) on surfaces of the clusters.

Said condensation herein may be classified as dehydration condensation and alcohol condensation. In the dehydration condensation, a siloxane linkage is formed through binding between hydroxyl groups (OH) introduced into the silica precursor during hydrolysis in step a), and then water is removed. In addition, in the alcohol condensation, a siloxane linkage is formed through binding between said hydroxyl group and an alkoxy group (OR), and then alcohol is removed. A method of performing said condensation and gelation reactions is not particularly limited, which may be carried out, for example, by stirring the mixture at a suitable temperature condition.

Step c) of the present invention is a step of mixing ferromagnetic nanoparticle clusters, on which silica shell parts are formed, and a thermosetting resin or a photocurable resin. Photonic crystals having a certain interval of 1 nm to 10 nm for measuring magnetic properties are obtained through a suitable formulation of silica/ferromagnetic nanoparticle clusters and a thermosetting resin or a photocurable resin. Here, a mixing ratio of silica/ferromagnetic nanoparticle clusters and a thermosetting resin or a photocurable resin is particularly limited, and for example, said mixture may comprise 0.05 to 20 parts by weight of said silica/ferromagnetic nanoparticle clusters based on 100 parts by weight of the thermosetting resin or photocurable resin. If a content ratio of the mixture departs from the specific ranges, the certain interval formed between said silica/ferromagnetic nanoparticle clusters may be at an interval for which it is difficult to measure electric currents.

Step d) of the present invention is a step of applying heat or light to the resulting appropriate mixture in said step c) to form a photonic crystal layer. When the resulting mixture through said content ratio is exposed to heat or light, the thermosetting resin or photocurable resin causes a cross-linking phenomenon, whereby it serves as an adhesive, linking intervals between silica/ferromagnetic nanoparticle clusters.

In the present invention, a temperature range of said heat is not particularly limited, which may be suitably selected depending on the used thermosetting resin, but may be preferably 100° C. to 250° C. and more preferably 100° C. to 200° C.

A wavelength range of said light herein is not particularly limited, but it can be preferred to be 300 nm to 700 nm.

In addition, an exposure time of said mixture to light is not particularly limited, but it can be preferred to be 10 seconds or more. The upper limit of said light exposure time is not particularly limited, which may be controlled, if needed, and be preferably 1 minute or less, more preferably 30 seconds or less. If said light exposure time is less than 10 seconds, curing may be inadequately performed, since complete photoresponse in the photocurable resin of said mixture does not occur.

Figure 2:
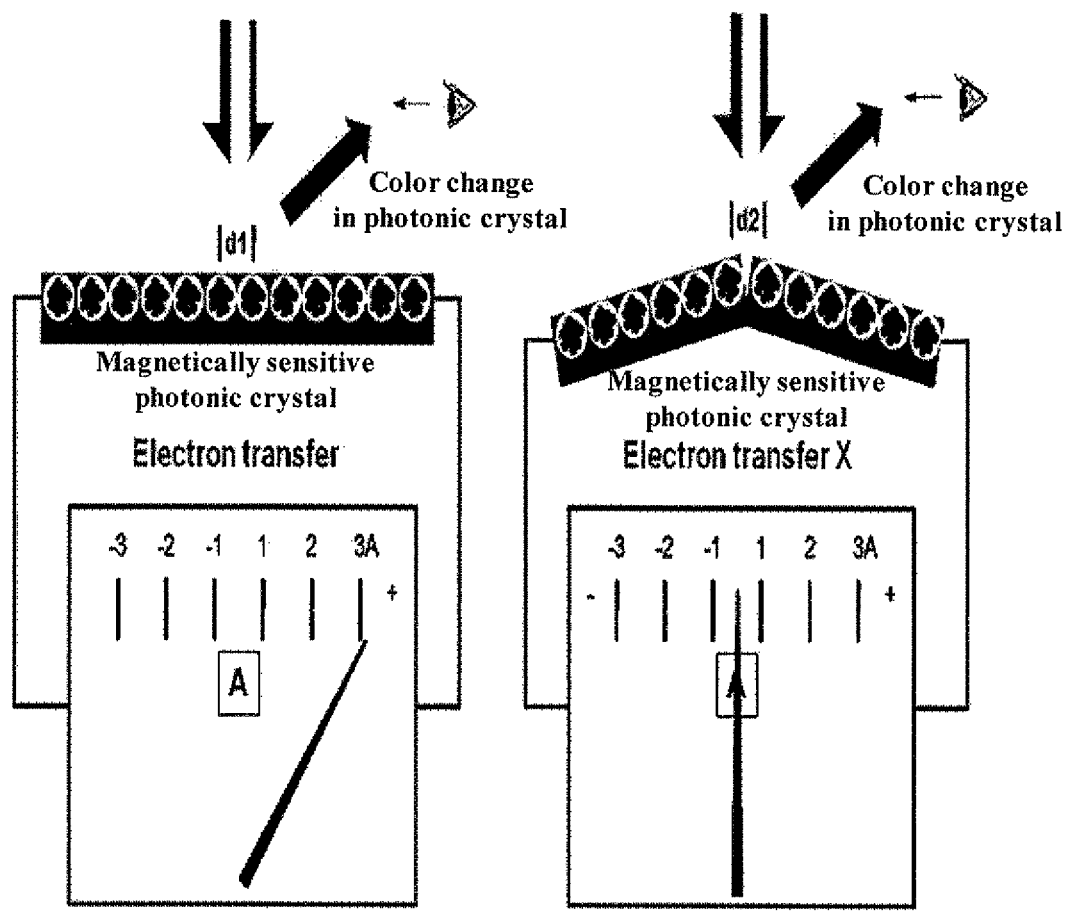
FIG. 2 represents an optical observation of wavelength change and a measurement of current flow depending on change of distance between particles of a magnetic body included in a device for measuring a deformation ratio of a structure according to one aspect of the present invention.

As shown in the attached FIG. 2, when deformation occurs in intervals of the homogeneously aligned magnetic body, magnetic flux in a shallow surface layer part escapes into space over surfaces of a ferromagnetic body. When the magnetic flux, which escapes into the space of this deformed part, is more, change of magnetic flux is observed and deformation can be measured by using this change.

Accordingly, when the structure to which a device for measuring a deformation ratio of a structure comprising a photonic crystal layer according to the present invention is attached is deformed in portion, change of magnetic flux that escapes into space in said deformed portion is observed and the correct deformation ratio can be simply measured by measuring this change.

EXAMPLES

The present invention is explained in more detail through examples according to the present invention below, the scope of which is not restricted by the following examples.

Example 1

A device for measuring a deformation ratio of a structure comprising a photonic crystal layer with magnetic sensitivity was manufactured through each of the following steps, the schematic view of which was represented in the attached FIG. 1.

Figure 3:
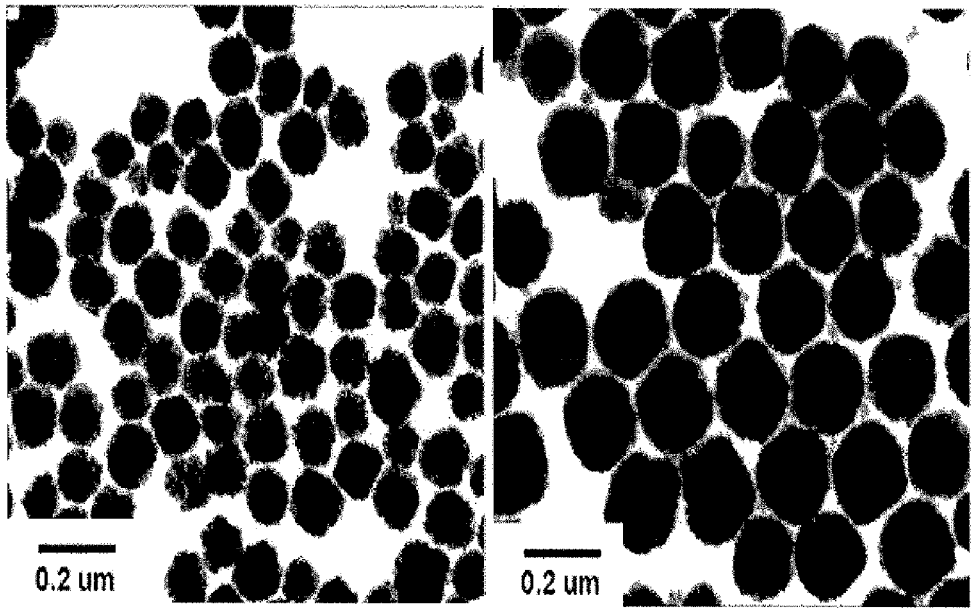
FIG. 3 are transmission electron micrographs in size showing a magnetic body included in a device for measuring a deformation ratio of a structure according to one aspect of the present invention, respectively.
Figure 4:
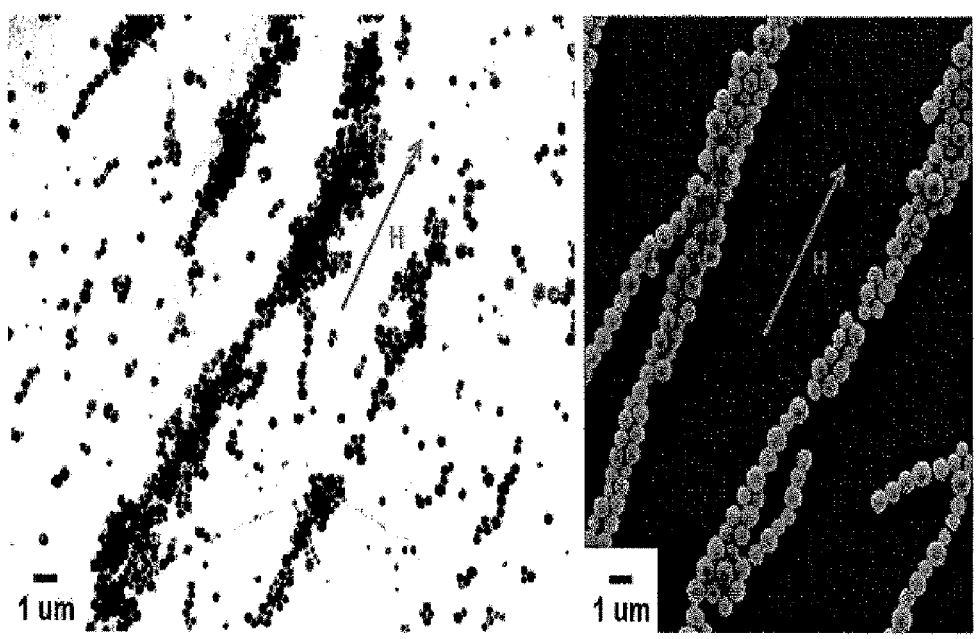
FIG. 4 is a transmission electron micrograph and a scanning electron micrograph, respectively, wherein a magnetic body is aligned by sampling a magnetic body solution included in a device for measuring a deformation ratio of a structure according to one aspect of the present invention and applying electric field thereto.
Figure 5:
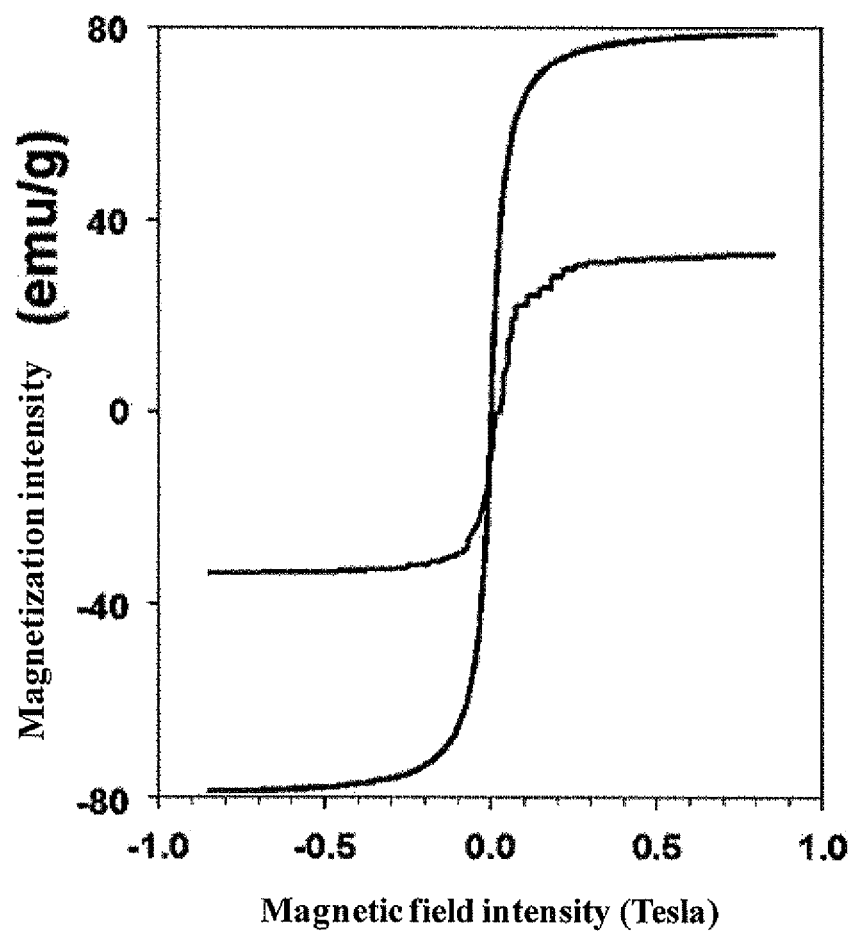
FIG. 5 is a graph showing that each magnetic intensity of magnetic nanoparticles is measured depending on a core size of a magnetic body included in a device for measuring a deformation ratio of a structure according to one aspect of the present invention.
Figure 6:
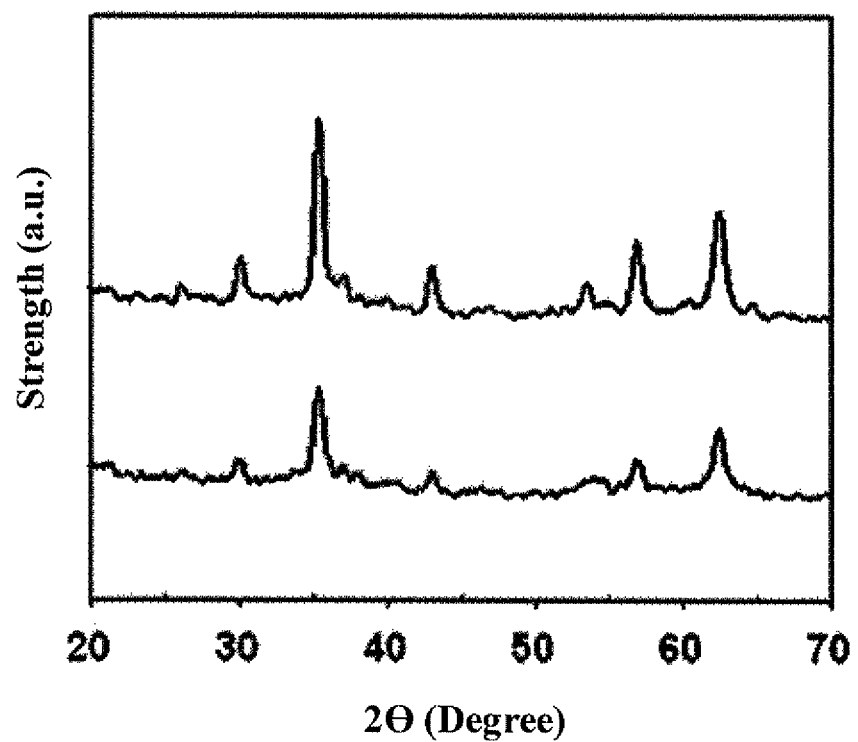
FIG. 6 is a graph depicting a result of a magnetic body included in a device for measuring a deformation ratio of a structure according to one aspect of the present invention by a thermogravimetric analysis (TGA), respectively.
Figure 7:
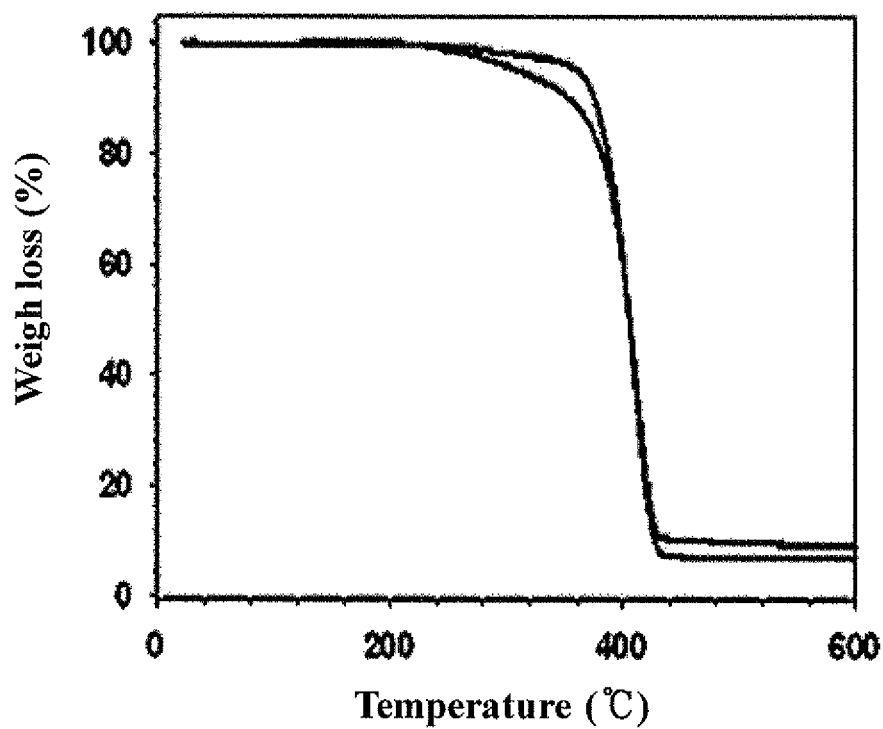
FIG. 7 is an X-ray diffraction analysis (XRD) graph for crystallinity analysis of a magnetic body included in a device for measuring a deformation ratio of a structure according to one aspect of the present invention, respectively.
Figure 8:
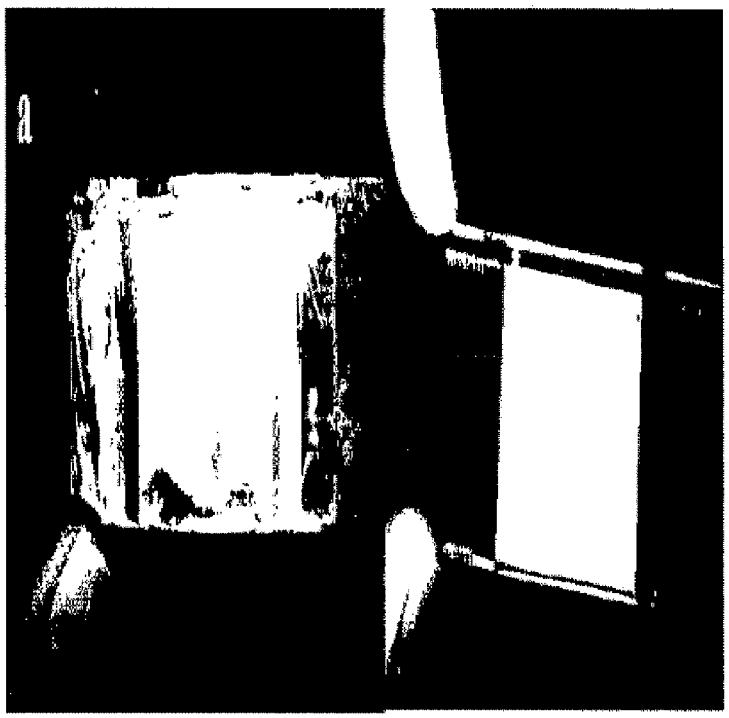
FIG. 8 is a photograph of a flexible photonic crystal solidified in a form where a magnetic body and a photo-curable resin are mixed, wherein the magnetic body and the photo-curable resin are included in a device for measuring a deformation ratio of a structure according to one aspect of the present invention.
Figure 9:
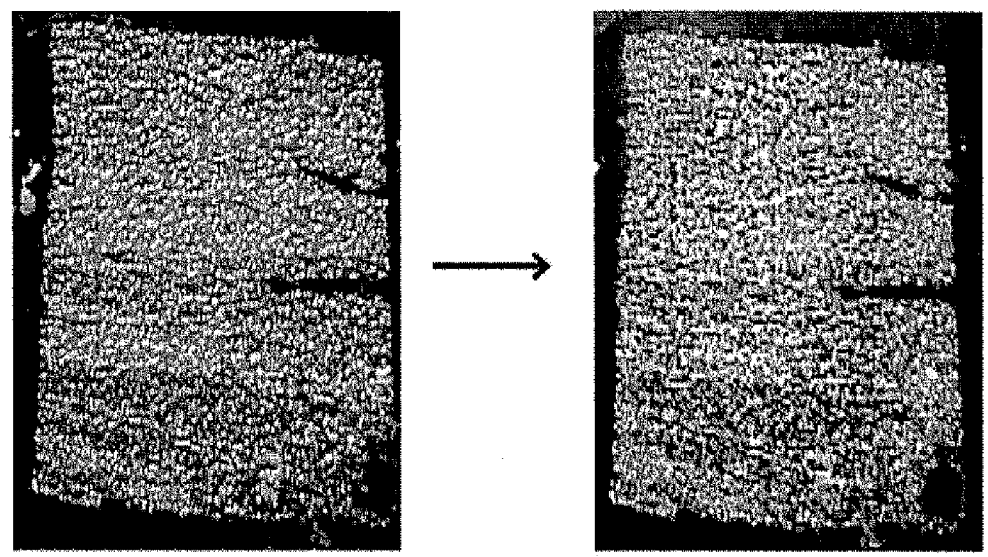
FIG. 9 is each photograph of flexible photonic crystals where a magnetic body and a photo-curable resin are solidified, wherein the magnetic body and the photo-curable resin are included in a device for measuring a deformation ratio of a structure according to one aspect of the present invention, which are color change photographs prior to and after applying stress.
Figure 10:
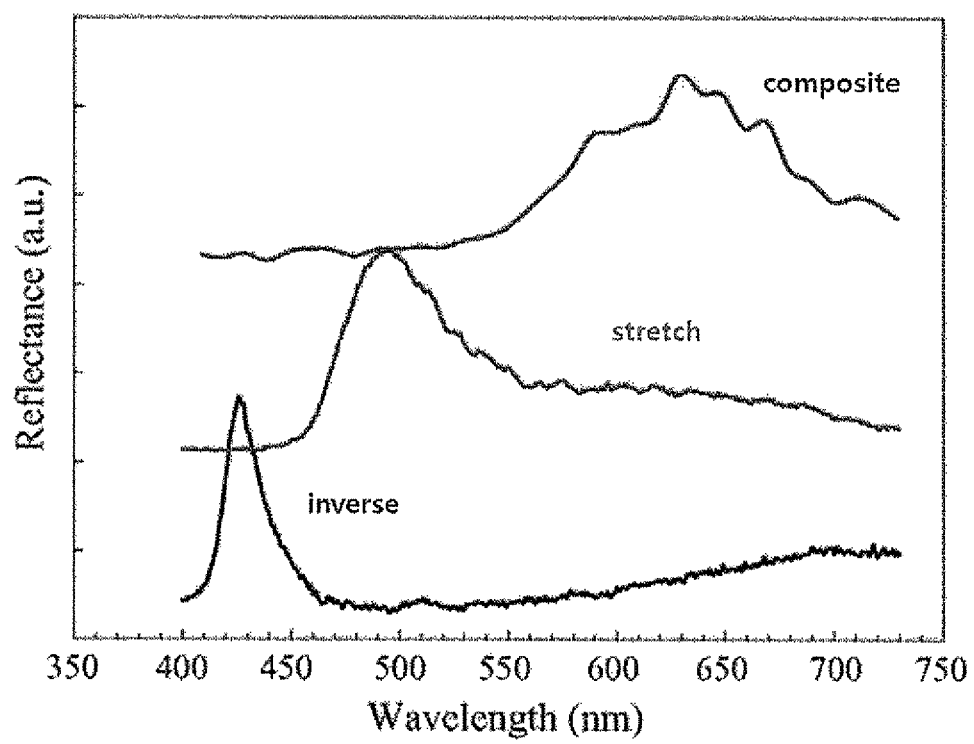
FIG. 10 is each graph of measuring reflected light prior to and after applying stress to a flexible photonic crystal complex where a magnetic body and a photo-curable resin are solidified, wherein the magnetic body and the photo-curable resin are included in a device for measuring a deformation ratio of a structure according to one aspect of the present invention, and after removing magnetically sensitive nanoparticles.
Figure 11:
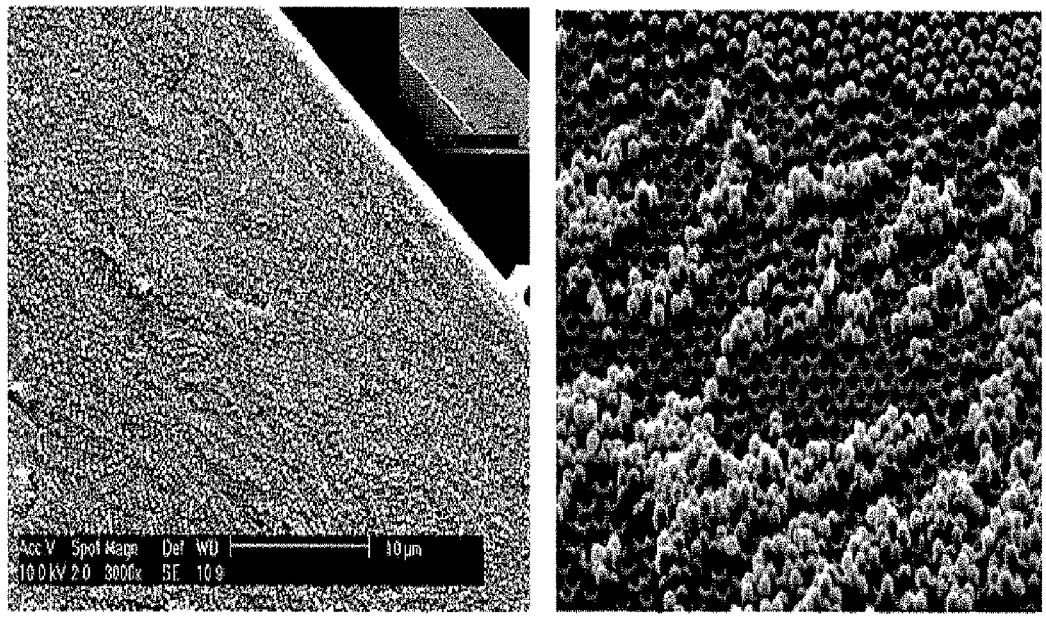
FIG. 11 is a scanning electron micrograph of a section prior to applying stress to a flexible photonic crystal complex where a magnetic body and a photo-curable resin are solidified, wherein the magnetic body and the photo-curable resin are included in a device for measuring a deformation ratio of a structure according to one aspect of the present invention, and after removing magnetically sensitive nanoparticles.
Figure 12:
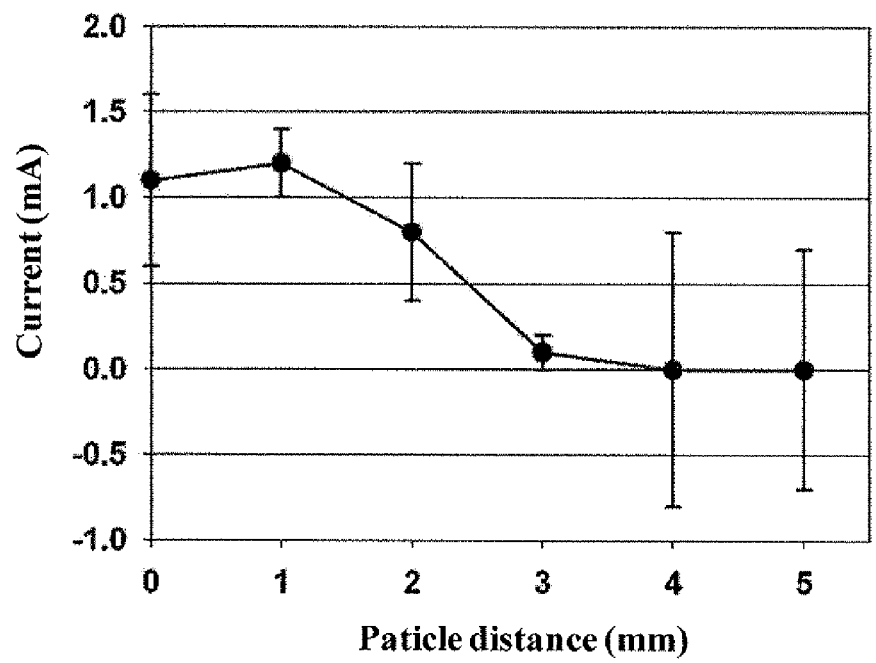
FIG. 12 is each a graph of measuring a degree of current flow prior to and after applying stress by linking voltage to a flexible photonic crystal complex where a magnetic body and a photo-curable resin are solidified, wherein the magnetic body and the photo-curable resin are included in a device for measuring a deformation ratio of a structure according to one aspect of the present invention.

(I) Preparation of Magnetic Nanoparticles 0.2 mol of iron triacetylacetonate, 1 mol of 1,2-hexadecanediol, 0.6 mol of dodecanoic acid and 0.6 mol of dodecylamine were added to 20 ml of benzyl ether solvent, and heated at 150° C. for 30 minutes and then heated at 290° C. for 30 minutes to prepare magnetite ($Fe_3O_4$) with a size of 12 nm. The prepared magnetite (magnetic nanoparticles) was purified by using pure ethanol and a transmission electron micrograph (TEM) of the above purified magnetite is represented in FIG. 3.

(2) Preparation of Ferromagnetic Nanoparticle Clusters

Using the above purified magnetite (magnetic nanoparticles), ferromagnetic nanoparticle clusters (hereinafter, referred to "MNCs") were prepared in an oil phase/aqueous phase (O/W) emulsion method. Specifically, 200 mg of cetyltrimethylammonium bromide was dissolved in 20 ml of ultrapure water as an aqueous phase and 5 mg of the above prepared magnetic nanoparticles was dissolved in chloroform as an oil phase to prepare an emulsion. By stirring the prepared emulsion for about 6 hours to remove the oil phase and centrifuging it three times to remove impurities, high sensitive ferromagnetic nanoparticle clusters agglomerated in a size of 200 nm were prepared.

(3) Preparation of Ferromagnetic Nanoparticle Clusters Coated with Silica 1 ml of an aqueous solution including 5 mg of the above prepared ferromagnetic nanoparticle clusters was mixed with 4 ml of ethanol for alcohol condensation. In addition, 0.1 ml of ammonia solution was added thereto to accelerate the above reaction and then, 60 μl of tetraethylorthosilicate solution was slowly added thereto. This reaction was performed at 27° C. for 12 hours to form a silica coating layer on surfaces of ferromagnetic nanoparticle clusters. The prepared silica/ferromagnetic nanoparticle clusters were obtained by separation via centrifuge.

(4) Mixing of Silica/Ferromagnetic Nanoparticle Clusters and a Photocurable Resin The above obtained silica/ferromagnetic nanoparticle clusters were separated via magnetic property, and then 0.5 parts by weight of the above silica/ferromagnetic nanoparticle clusters were dispersed in 100 parts by weight of polyethylene glycol diacrylate as a photocurable resin.

(5) Preparation of a Flexible Photonic Crystal Layer Containing Silica/Ferromagnetic Nanoparticle Clusters A mixture of the above silica/ferromagnetic nanoparticle cluster and the photocurable resin was applied on a surface of a substrate to have a thickness of 1 cm after curing, and the photocurable resin was cured by irradiating thereon with light having a wavelength of 355 nm for 30 seconds to prepare a photonic crystal layer.

The invention claimed is:

1. A device for measuring a deformation ratio of a structure comprising
   a substrate attached on said structure; and
   a photonic crystal layer formed on said substrate containing nanoparticles aligned at a nanometer scale interval,
   wherein when said structure is deformed, change of intervals between said nanoparticles included in said photonic crystal layer occurs, thereby structural color and magnetic flux in a portion of the deformed photonic crystal layer are changed, so that a degree of deformation in said structure may be measured on the basis of said change of structural color or magnetic flux,
   wherein said nanoparticles are one or more selected from the group consisting of polystyrene, poly(meth)acrylic acid ester, poly(meth)acrylamide, polysiloxane, amphiphatic polystyrene/methacrylate block copolymer and a magnetic body,
   wherein the magnetic body has a form comprising ferromagnetic nanoparticle clusters; and a coating layer enclosing said clusters.

2. The device for measuring a deformation ratio of a structure according to claim 1, wherein the nanoparticles are aligned at a certain interval of 1 nm to 10 nm.

3. The device for measuring a deformation ratio of a structure according to claim 1, wherein the nanoparticles have a diameter of 50 nm to 300 nm.

4. The device for measuring a deformation ratio of a structure according to claim 1, wherein the magnetic body is one or more selected from the group consisting of a metal material, a magnetic material and a magnetic alloy.

5. The device for measuring a deformation ratio of a structure according to claim 4, wherein the metal material is one or more selected from the group consisting of Pt, Pd, Ag, Cu and Au.

6. The device for measuring a deformation ratio of a structure according to claim 4, wherein the magnetic material is one or more selected from the group consisting of Co, Mn, Fe, Ni, Gd, Mo, $MM'_2O_4$ and $MxOy$, where said M and M' represent each independently Co, Fe, Ni, Zn, Gd or Cr, $0<x\leq3$, and $0<y\leq5$.

7. The device for measuring a deformation ratio of a structure according to claim 4, wherein the magnetic alloy is one or more selected from the group consisting of CoCu, CoPt, FePt, CoSm, NiFe and NiFeCo.

8. The device for measuring a deformation ratio of a structure according to claim 1, wherein the coating layer is one or more selected from the group consisting of silica, polyalkylene glycol, polyetherimide, polyvinylpyrrolidone, hydrophilic polyamino acid and hydrophilic vinyl-based polymer resin.

9. The device for measuring a deformation ratio of a structure according to claim 1, wherein the photonic crystal layer has a thickness of 5 μm to 10 μm.

10. The device for measuring a deformation ratio of a structure according to claim 1, wherein the photonic crystal layer comprises a thermosetting resin or a photocurable resin and nanoparticles which are aligned at a certain interval in the thermosetting resin or the photocurable resin.

11. The device for measuring a deformation ratio of a structure according to claim 10, wherein the thermosetting resin is one or more selected from the group consisting of an epoxy resin, a polyester resin, a phenol resin, a urea resin and a melamine resin.

12. The device for measuring a deformation ratio of a structure according to claim 10, wherein the photocurable resin is one or more selected from the group consisting of polyurethaneacrylate, polyisoprene acrylate or esterified compounds thereof, hydrogenated terpene resins, butadiene polymers, bisphenol diacrylate-based resins and polyethyleneglycol diacrylate.

13. A method of measuring a deformation ratio of a structure comprising
   a first step of forming a photonic crystal layer on a substrate;
   a second step of attaching the substrate on which said photonic crystal layer is formed to
   a surface of the target structure for measuring deformation; and
   a third step of measuring change of structural color or magnetic flux in said photonic crystal layer,
   wherein said photonic crystal layer contains nanoparticles aligned at a nanometer scale interval,
   wherein when said structure is deformed, change of intervals between said nanoparticles included in said photonic crystal layer occurs, thereby structural color and magnetic flux in a portion of the deformed photonic crystal layer are changed, so that a degree of deformation in said structure may be measured on the basis of said change of structural color or magnetic flux, wherein the photonic crystal layer is prepared by a method of preparation comprising the steps of
a) mixing ferromagnetic nanoparticle clusters and a precursor of a coating layer;
b) forming a coating layer on the ferromagnetic nanoparticle clusters using said precursor of the coating layer;
c) mixing said ferromagnetic nanoparticle clusters on which said coating layer is formed with a thermosetting resin or a photocurable resin; and
d) applying heat or light to said mixture to prepare a photonic crystal layer.

* * * * *

UNITED STATES PATENT AND TRADEMARK OFFICE
CERTIFICATE OF CORRECTION

PATENT NO. : 8,671,769 B2  
APPLICATION NO. : 13/203217  
DATED : March 18, 2014  
INVENTOR(S) : Seung Joo Haam et al.

Page 1 of 1

It is certified that error appears in the above-identified patent and that said Letters Patent is hereby corrected as shown below:

TITLE PAGE: ITEM 75 should read

Seung Joo Haam, Seoul (KR); Yun Mook Lim, Seoul (KR); Yoon Cheol Lim, Seoul (KR);

JoSeph Park, Seoul (KR); Byunghoon Kang, Seoul (KR)

Signed and Sealed this  
Seventeenth Day of March, 2015

Michelle K. Lee  
*Director of the United States Patent and Trademark Office*